US010829318B2

United States Patent
Kreft (10) Patent No.: US 10,829,318 B2
(45) Date of Patent: Nov. 10, 2020

(54) PASSIVE PART STACKER (71) Applicant: Caromation, Inc., Raleigh, NC (US)

(72) Inventor: G. Scott Kreft, Morrisville, NC (US)

(73) Assignee: Caromation, Inc., Raleigh, NC (US)

(*) Notice: Subject to any disclaimer, the term of this patent is extended or adjusted under 35 U.S.C. 154(b) by 0 days.

(21) Appl. No.: 16/454,004

(22) Filed: Jun. 26, 2019

(65) Prior Publication Data
US 2020/0095073 A1 Mar. 26, 2020

Related U.S. Application Data (60) Provisional application No. 62/689,879, filed on Jun. 26, 2018.

(51) Int. Cl.
A47F 7/00 (2006.01)
B65G 57/03 (2006.01)
B65G 1/14 (2006.01)

(52) U.S. Cl.
CPC ............ B65G 57/03 (2013.01); A47F 7/0014 (2013.01); A47F 7/0042 (2013.01); B65G 1/14 (2013.01)

(58) Field of Classification Search
CPC ........ B65G 1/02; B65G 1/14; B65G 90/0073; B65G 57/03; B65G 57/00; A47B 46/00; A47B 46/005; A47B 57/045; A47F 5/0037; A47F 5/12; A47F 5/16; A47F 2005/165; A47F 7/0042; A47F 7/0007; A47F 7/0014
USPC ..................... 211/41.1, 59.4, 150, 169, 49.1; 414/788.1; 312/9.58
See application file for complete search history.

(56) References Cited

U.S. PATENT DOCUMENTS

| | | | | | |
|---|---|---|---|---|---|
| 1,135,215 | A | * | 4/1915 | Silvius | .................. A47B 63/02 211/169.1 |
| 2,570,198 | A | * | 10/1951 | Brager | ................ B65G 47/846 221/237 |
| 2,675,133 | A | * | 4/1954 | Ostlund | ................... B65G 1/14 211/59.4 |
| 2,827,200 | A | * | 3/1958 | Lux | ........................ G07F 11/06 221/90 |
| 2,982,419 | A | * | 5/1961 | Shiels | .................. A47F 5/0087 108/59 |
| 3,103,422 | A | * | 9/1963 | Green | ..................... F26B 25/18 34/238 |
| 3,151,576 | A | * | 10/1964 | Patterson | ............. A47F 5/0087 108/2 |

(Continued)

Primary Examiner — Jennifer E. Novosad
(74) Attorney, Agent, or Firm — Panagos Kennedy PLLC; Daniel Checkowsky; Bill Panagos (57) ABSTRACT A passive part stacker includes a first pivot arm pivotably attached to a frame and rotatable about a first pivot arm axis of rotation between a retracted position and an extended position. The first pivot arm includes a first component support finger that extends radially from a first pivot arm body and a first cam. The part stacker also includes a second pivot arm pivotally attached to the frame and rotatable about a second pivot arm axis of rotation between a retracted position and an extended position. The second pivot arm includes a second component support finger extending radially from a second pivot arm body and a second cam follower engageable with the first cam of the first pivot arm. The second pivot arm is pivotable from a retracted position to a receiving position in response to moving the first pivot arm from its receiving position to its extended position.

14 Claims, 5 Drawing Sheets (56) References Cited

U.S. PATENT DOCUMENTS

| | | | | | |
|---|---|---|---|---|---|
| 3,231,103 | A | * | 1/1966 | Tantlinger | B65G 57/26 211/49.1 |
| 3,251,477 | A | * | 5/1966 | Parstorfer | A47F 5/05 211/169 |
| 3,384,266 | A | * | 5/1968 | Schuller | A47F 1/04 221/90 |
| 3,556,620 | A | * | 1/1971 | Gutierrrez | A47F 3/06 312/136 |
| 3,812,975 | A | * | 5/1974 | Gutierrez | B42F 17/02 211/40 |
| 4,161,017 | A | * | 7/1979 | Pierce | H05K 7/1417 16/266 |
| 4,200,195 | A | * | 4/1980 | Hager | B62B 3/006 108/177 |
| 4,317,514 | A | * | 3/1982 | Noren | A47L 15/248 134/128 |
| 4,359,162 | A | * | 11/1982 | Mayer | B65G 1/14 108/2 |
| 4,549,663 | A | * | 10/1985 | Corbett, Jr. | B65G 1/14 211/13.1 |
| 4,572,382 | A | * | 2/1986 | Niederprum | B65G 1/14 108/134 |
| 4,712,691 | A | * | 12/1987 | Grill | B65G 1/14 211/150 |
| 4,733,781 | A | * | 3/1988 | Gerlach | B65D 85/68 211/85.8 |
| 4,836,518 | A | * | 6/1989 | Janutta | B23Q 3/063 269/37 |
| 4,909,412 | A | * | 3/1990 | Cerf | B65G 59/105 221/1 |
| 5,005,712 | A | * | 4/1991 | Niederprum | A47F 7/0042 211/150 |
| 5,217,121 | A | * | 6/1993 | Walker | B65G 1/14 211/41.1 |
| 5,301,824 | A | * | 4/1994 | Schoeller | B65G 1/14 211/150 |
| 5,373,756 | A | * | 12/1994 | Schoeller | B65G 1/14 414/795.3 |
| 5,411,234 | A | * | 5/1995 | Schoeller | B65G 1/14 187/213 |
| 5,938,051 | A | * | 8/1999 | Scholler | B65G 1/14 211/150 |
| 5,988,777 | A | * | 11/1999 | Schoeller | B65G 1/14 211/41.1 |
| 6,135,294 | A | * | 10/2000 | Shuert | B65D 19/385 211/13.1 |
| 6,223,911 | B1 | * | 5/2001 | Weaver | A47B 47/027 211/150 |
| 6,234,743 | B1 | * | 5/2001 | Strobel | B65G 1/14 211/150 |
| 6,394,286 | B1 | * | 5/2002 | Dueck | A47F 7/166 211/1.57 |
| 6,405,883 | B1 | * | 6/2002 | Schambach | B65G 1/14 211/150 |
| 6,530,566 | B1 | * | 3/2003 | DuVernay | B25B 5/12 269/201 |
| 7,070,058 | B2 | * | 7/2006 | Strobel | B65G 1/14 211/150 |
| 7,210,892 | B2 | * | 5/2007 | Strobel | B65G 1/14 211/150 |
| 7,347,654 | B2 | * | 3/2008 | Mondejar Jimenez | B65G 1/14 410/32 |
| 7,857,146 | B2 | * | 12/2010 | Disch | A47L 15/505 211/41.3 |
| 7,878,343 | B2 | * | 2/2011 | Strobel | B65G 1/14 211/150 |
| 8,496,127 | B2 | * | 7/2013 | Strobel | B65G 1/14 211/150 |
| 8,770,568 | B2 | * | 7/2014 | Buck | B65D 19/38 108/106 |
| 9,022,371 | B2 | * | 5/2015 | Seghezzi | B65G 1/14 211/57.1 |
| 9,206,656 | B2 | * | 12/2015 | Roodenburg | A47F 7/0028 |
| 10,280,002 | B2 | * | 5/2019 | Giachero | B65G 1/14 |
| 10,422,179 | B2 | * | 9/2019 | Goldfinch | E06B 7/00 |
| 2006/0226102 | A1 | * | 10/2006 | Strobel | B65G 1/14 211/150 |
| 2007/0152544 | A1 | * | 7/2007 | Strobel | B65G 1/14 312/9.58 |
| 2007/0160453 | A1 | * | 7/2007 | Jimenez | B65G 1/14 414/791.6 |

\* cited by examiner

PASSIVE PART STACKER

RELATED APPLICATIONS

This application claims the benefit of U.S. Provisional Application No. 62/689,879, entitled Passive Part Stacker, filed on Jun. 26, 2018, which is herein incorporated by reference in its entirety.

BACKGROUND AND SUMMARY

Manufacturing assembly processes may use parts that are stored prior to assembly or further processing. The parts may be stacked on racks to minimize storage space and provide access to the parts. Certain parts, such as sheet metal stampings, tend to nest rather together rather tightly when stacked directly on top of one another. To avoid this, the parts rack may include various stacking features designed to maintain a space between adjacent stacked parts. Desirably, the stacking features may be configured to allow the parts to be inserted and removed from the rack with relative ease while enabling a selected spacing to be maintained between the stacked parts.

Disclosed is a passive part stacker capable of maintaining a selected spacing between adjacent stacked parts. The part stacker may include one or more stacker columns used to support the stacked parts. The stacker column may be arranged around a perimeter of the stacked parts. The part stacker may include multiple pivot arms pivotably attached to a frame of the stacker column. The pivot arms support parts loaded onto the part stacker.

The pivot arm may include a cam that extends radially outward from a body of the pivot arm. The pivot arm may also include a cam follower that is engagable with a cam of an adjacently located pivot arm. The pivot arm may be rotated about its connection to the frame of the stacker column between a retracted position and an extended position. The pivot arm may also be pivoted to an intermediate component receiving position located between the extended and retracted positions.

Initially loading a part onto the part stacker causes a pivot arm onto which the part is loaded to pivot from its component receiving position to its extended position. This in turn causes the cam of the pivot arm to pivot into contact with a cam follower of an adjacently located pivot arm. Loading the part onto the pivot arm causes the pivot arm to rotate from its component receiving position to its extended position. This in turn causes the cam on the pivot arm to simultaneously rotate around the pivot arm connection to the frame. As this occurs, the cam follower of the adjacent pivot arm moves along the cam of the first pivot to cause the adjacent pivot arm to pivot from its retraced position to its component receiving position. The process may be successively repeated for adjacent pivot arms, whereby moving one pivot arm from a component receiving position to an extended position causes adjacent pivot arm to pivot from its retracted position to its component receiving position.

BRIEF DESCRIPTION OF THE DRAWINGS

The various features, advantages and other uses of the present apparatus will become more apparent by referring to the following detailed description and drawings, in which.

DETAILED DESCRIPTION

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

Figure 1:
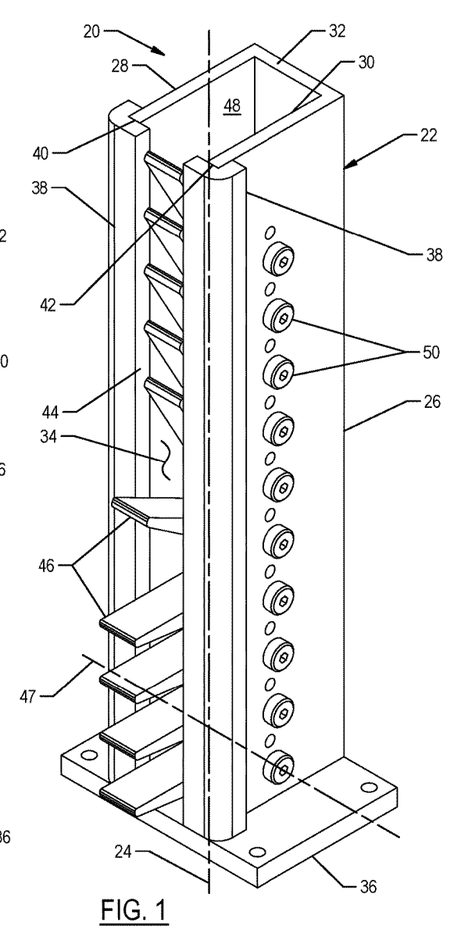
FIG. 1 is a perspective view of a stacker column that may be employed with a passive part stacker.
Figures 2, 3:
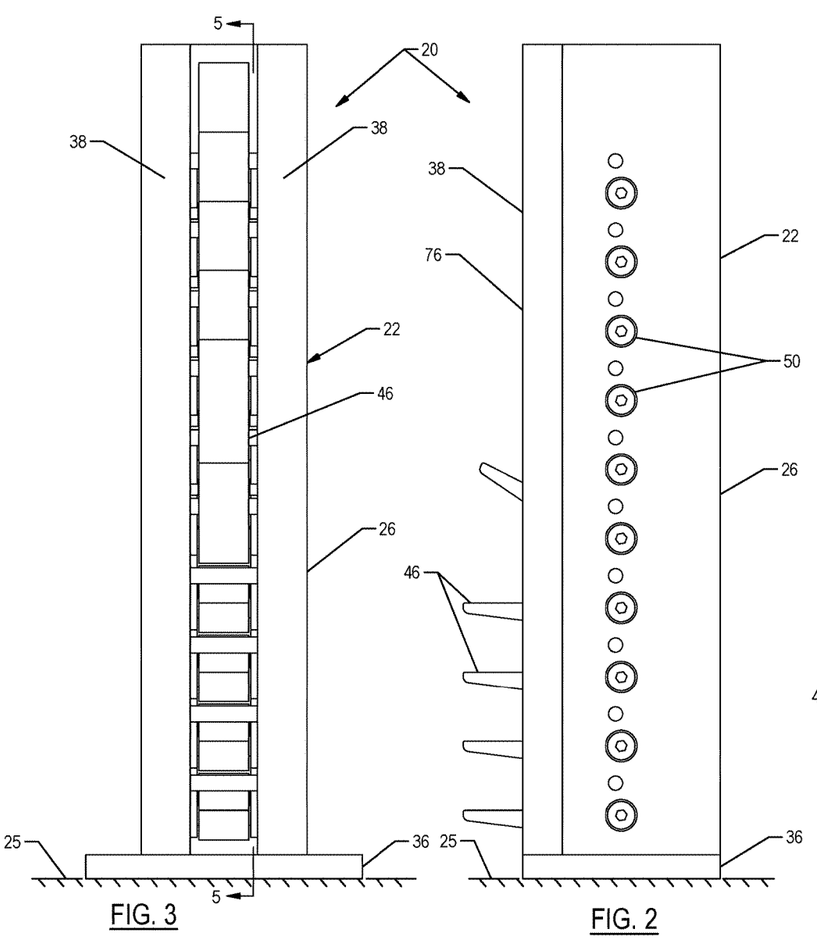
FIG. 2 is a side elevational view of the stacker column.
FIG. 3 is front elevational view of the stacker column.
Figure 4:
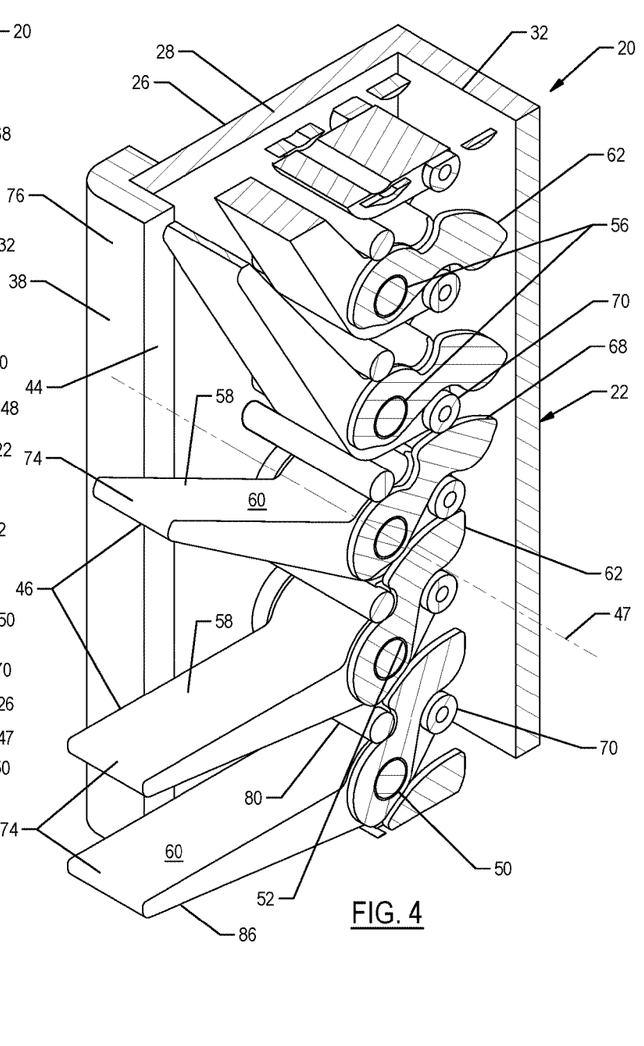
FIG. 4 is a partial cross-sectional perspective view of the stacker column.
Figure 5:
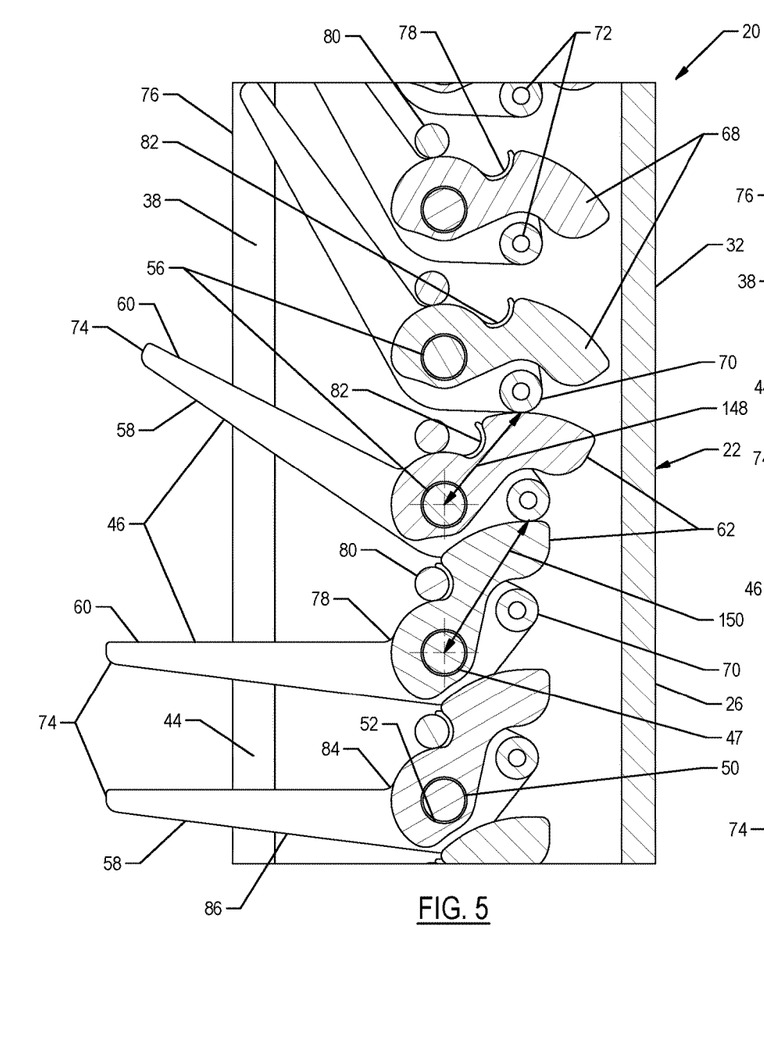
FIG. 5 is partial cross-sectional side view of the stacker column.
Figure 6:
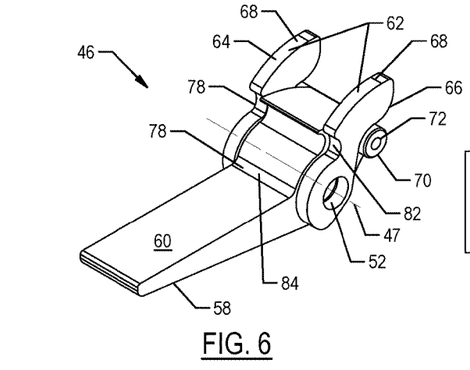
FIG. 6 is a front perspective view of a pivot arm that may be employed with the stacker column.
Figure 7:
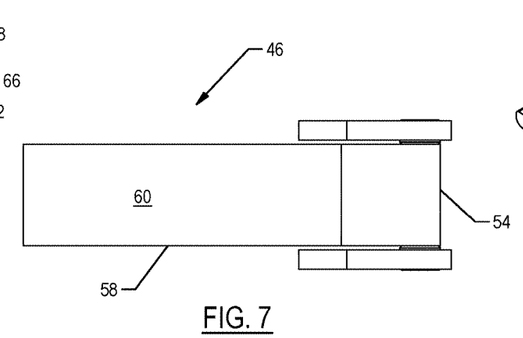
FIG. 7 is a top elevational view of the pivot arm.
Figure 8:
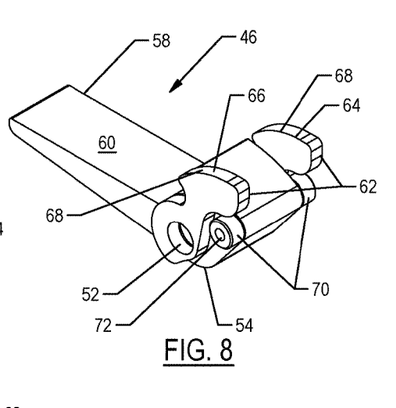
FIG. 8 is a rear perspective view of the pivot arm.
Figure 9:
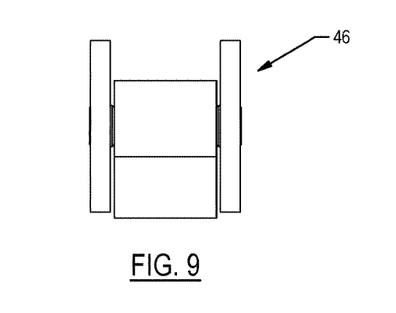
FIG. 9 is front elevational view of the pivot arm.
Figure 10:
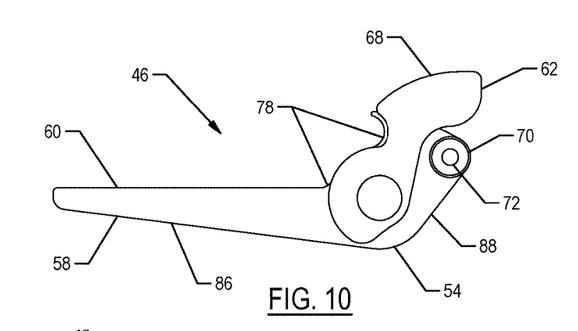
FIG. 10 is a side elevational view of the pivot arm.
Figure 11:
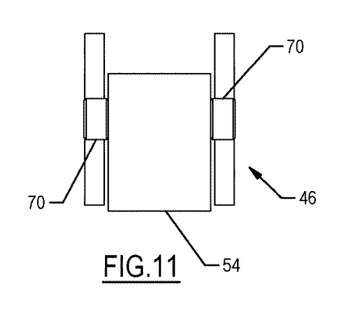
FIG. 11 is a rear elevational view of the pivot arm.
Figure 12:
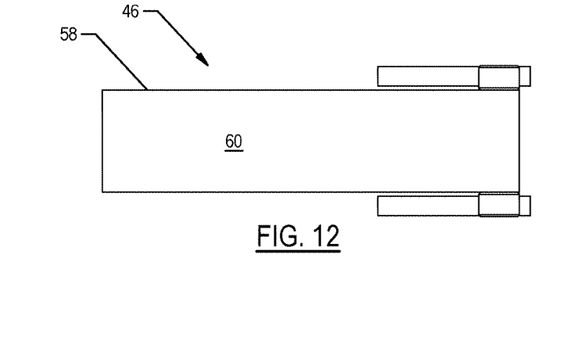
FIG. 12 is a bottom elevational view of the pivot arm.
Figures 13, 17:
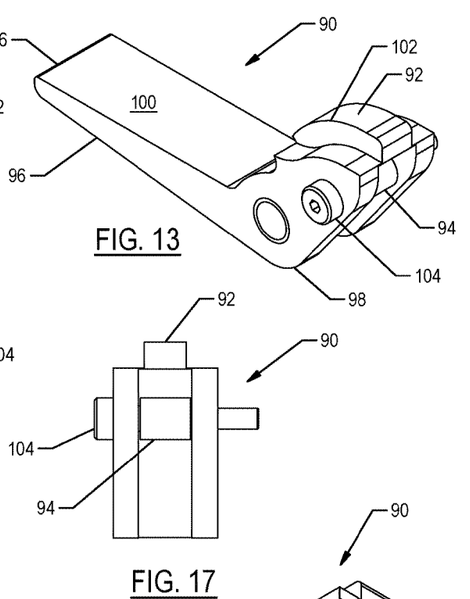
FIG. 13 is a perspective view of an alternately configured pivot arm that may be employed with the stacker column.
FIG. 17 is a rear elevational view of the pivot arm of FIG. 13.
Figure 14:
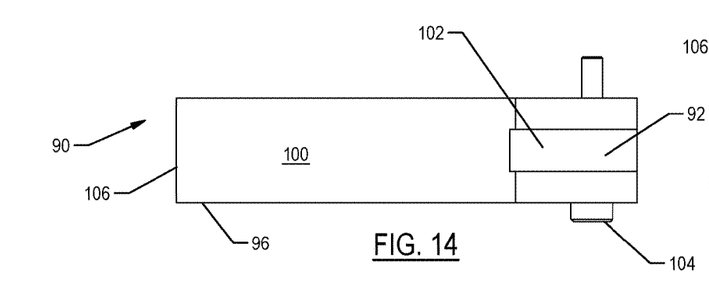
FIG. 14 is a top elevational view of the pivot arm of FIG. 13.

A passive part stacker may be used in various manufacturing and assembly operations to stack components. The passive part stacker enables multiple components to be stacked one above the other with a space provided between adjacent components. FIGS. 1-3 illustrate a passive part stacker 20 that may include a stacker column 22 that may be used to stack multiple components vertically one above the other. One or more stacker columns 22 may be used to support the stacked components, depending on the size and shape of the components. The stacker column 22 may be arranged around a perimeter of the stacked components. A longitudinal axis 24 of the stacker column 22 may be oriented vertically relative to a ground surface 25, or alternatively, at an angle. The respective longitudinal axes 24 of multiple stacker columns 22 may be arranged substantially parallel to one another or at varying angles relative to ground surface 25.

With reference to FIGS. 1-5, the stacker column 22 may include a frame 26 having a generally U-shaped cross-section. The frame 26 may include a frame first sidewall 28 and a frame second sidewall 30 spaced apart from the frame first sidewall 28. The frame first sidewall 28 and frame second sidewall 30 may be connected to one another by a frame third sidewall 32 that extends between and is attached to the frame first sidewall 28 and the frame second sidewall 30. The frame first sidewall 28 and the frame second sidewall 30 may form the legs of the U-shaped cross-section and the frame third sidewall 32 may form the bottom of the U-shaped cross-section. The frame 26 is not limited to a U-shaped cross-section and other frame cross-sections and/or configurations may be employed. Other cross sections may include, but not limited to, H-shaped and I-Shaped.

Various attachment mechanisms may be used to connect the frame third sidewall 32 to the frame first sidewall 28 and the frame second sidewall 30, such as welding, brazing, adhesives, screws and bolts, as well as other connection mechanisms. The frame 26 may be integrally formed, with the three frame sidewalls forming as a single continuous piece.

The frame first sidewall 28, frame second sidewall 30 and the frame third sidewall 32 may each have a generally plate-like configuration. The sidewalls may include various features, such as apertures for reducing weight and/or cost. Alternatively, one or more of the frame sidewalls may have a different configuration. Depending on the particular application, it may not be necessary that the frame third sidewall 32 be employed. In some instances, one or more cross-braces may be used to connect the frame first sidewall 28 to the frame second sidewall 30.

The frame 26 may include a base 36 for attaching the stacker column 22 to a surface, such as a ground surface 25 or another piece of equipment. The base 36 may be attached to at least one of the frame first sidewall 28, frame second sidewall 30 and frame third sidewall 32. The base 36 may be configured to correspond with a surface and/or object to which the stacker column 22 is attached.

The frame 26 may include a bezel 38 attached to an edge 40 of the frame first sidewall 28 and attached to an edge 42 of the frame second sidewall 30. The bezel 38 may extend along an entire length of the frame 26. The bezel 38 may operate to provide a relatively smooth surface along which components may slide when loaded onto the passive part stacker 20. An inside edge 44 of the bezel 38 defines a frame opening 34 located opposite the frame third sidewall 32.

With reference to FIGS. 1-12, the stacker column 22 may include one or more pivot arms 46 used to support a component on the passive part stacker 20. The pivot arm 46 may be at least partially disposed within a hollow cavity 48 in the frame 26 between the frame first sidewall 28 and the frame second sidewall 30. A pivot arm fastener 50 may be used to pivotably connect the pivot arm 46 to the frame first sidewall 28 and the frame second sidewall 30. The pivot arm fastener 50 extends widthwise through an aperture 52 formed in a pivot arm body 54 to form a pivot connection 56 between the pivot arm 46 and the pivot arm fastener 50. The pivot arm fastener 50 may be a bolt or screw that threadably engages a threaded aperture formed in at least one of the frame first and second sidewalls 28, 30 or a nut. The pivot arm fastener 50 may also be a pin that may be secured to the frame 26 by a cotter pin, for example. Other types of mechanical fasteners may also be used to rotatably attach the pivot arm 46 to the frame 26. The pivot arm 46 is generally free to rotate within the frame 26 around a pivot arm axis of rotation 47 of the pivot arm fastener 50.

The pivot arm 46 may include a component support finger 58 that extends generally radially outward from the pivot arm body 54. The component support finger 58 includes a component support surface 60 on which a component rests when loaded on the passive part stacker 20. The component support fingers 46 may be contoured to correspond to a shape of the part being supported. The component support surface 60 may be coated with a non-marring protective coating or have a protective coating attached to the surface using any of various connection mechanisms, such as screws, bolts, rivets, adhesive, as well as others.

The pivot arm 46 may also include a cam 62 extending radially outward from the pivot arm body 54 in a direction generally opposite that of the component support finger 58. The cam 62 and the component support finger 58 may be located on opposite sides of the pivot arm body 54.

Depending on the application, a single or multiple cams may be employed. For example, the cam 62 may include a first cam 64 located along a side of the pivot arm body 54 and a second cam 66 located along an opposite side of the pivot arm body 54. The first cam 64 and the second cam 66 may be fixedly attached to the pivot arm body 54, or alternatively, integrally formed with the pivot arm body 54. The first cam 64 and the second cam 66 may include a contoured cam surface 68 engageable with a cam follower 70 attached to a second pivot arm located immediately adjacent the pivot arm 46. The cam surface 68 may be spaced progressively further lengthwise from the pivot arm axis of rotation 47. The cam surface 68 of the first cam 64 and the cam surface 68 of the second cam 66 may be similarly contoured.

The cam follower 70 may be attached to the pivot arm body 54. The cam follower 70 may be located adjacent the cam 62 along a side of the pivot arm body 54 opposite the component support finger 58. The cam follower 70 may be located below the cam surface 68 of the cam 62. A cam follower fastener 72, such as a bolt or screw, may be used to attach the cam follower 70 to the pivot arm body 54. The cam follower 70 may be rotatably connected to the pivot arm body 54, or alternatively, fixedly attached to the pivot arm body 54. If rotatably connected to the pivot arm body 54, the cam follower 70 may include a bearing to reduce rotational friction between the cam follower 70 and the cam follower fastener 72.

The pivot arm 46 may be pivoted about the pivot connection 56 between an extended position and a retracted position. When arranged in the extended position an end 74 of the component support finger 58 extends through the frame opening 34 beyond an outer face 76 of the bezel 38. When arranged in the retracted position the end 74 of the component support finger 58 does not extend beyond the outer face 76 of the bezel 38. The pivot arm 46 may be entirely disposed within the frame 26 when arranged in the retracted position.

The pivot arm 46 may include a pair of detents 78 that operate in conjunction with a stop 80 to limit a pivoting range of motion of the pivot arm 46. The pair of detents 78 may include a first detent 82 that operates on conjunction with the stop 80 to define the position of the pivot arm 46 when arranged in the extended position. A second detent 84 operates in conjunction with the stop 80 to define the position of the pivot arm 46 when arranged in the retracted position.

The first detent 82 may be located on the same side of the pivot arm body 54 as the cam 62 and spaced a radial distance from the pivot connection 56. The first detent 82 engages the stop 80 when the pivot arm 46 is arranged in the extended position.

The second detent 84 may be located on the same side of the pivot arm body 54 as the component support finger 58 and spaced a radial distance from the pivot connection 56. The second detent 84 engages the stop 80 when the pivot arm 46 is arranged in the retracted position.

The stop 80 may be configured as a bar having one end attached to the frame first wall 28 and an opposite second end attached to the frame second wall 30. Alternatively, the stop 80 may be configured as a stud extending inward from at least one of the frame first wall 28 and the frame second wall 30.

The first detent 82 and the second detent 84 may alternatively be positioned in a different location on the pivot arm 46. For example, the first detent 46 may be located along a lower surface 86 of the component support finger 58 at a radial distance from the pivot connection 56 and the second detent 84 may be located along a lower edge 88 of the pivot arm body 54 or the cam 62 on a side of the pivot connection 56 opposite the first detent 82. The location of the stop 80 may be determined based on the location of the first detent 82 and the second detent 84 and a desired angular orientation of the pivot arm 46 when arranged in the retracted and extended positions.

The pivot arm 46 may include a biasing member that operates to urge the pivot arm toward the retraced position. For example, the biasing member may include a coil spring encircling the pivot arm fastener 50 used to attach the pivot arm 46 to the frame 26. One end of the coil spring may be attached to the pivot arm 46 and an opposite end of the coil spring may be attached to the frame 26. The biasing member may include a leaf spring having one end attached to the frame 26 and an opposite end engaging the pivot arm 46. Gravity may also be employed to bias the pivot arm 46 toward the retracted position. This may be accomplished by configuring the cam side of the pivot arm 46 to weigh more than the component support finger side of the pivot arm 46. The weight imbalance will cause the pivot arm 46 to tend to rotate toward the retracted position when not supporting a component on the component support finger 58. Alternatively, differently configured biasing mechanisms may also be employed.

FIGS. 14-19 illustrate an alternately configured pivot arm 90 that may be employed with the stacker column 22. The pivot arm 90 may be similarly configured as the pivot arm 46, but may include a single cam 92 and single cam follower 94. The pivot arm 90 may include a component support finger 96 that extends generally radially outward from a pivot arm body 98. The component support finger 96 includes a component support surface 100 for supporting a component when loaded on the passive part stacker 20. The pivot arm 90 may include the cam 92 extending radially outward from the pivot arm body 98 in a direction generally opposite that of the component support finger 96. The cam 92 and the component support finger 96 may be located on opposite sides of the pivot arm body 98. The cam 92 may be generally centered across a width of the pivot arm body 98. The width of the pivot arm body 98 may be greater than a width of the cam 92. The cam 92 may be configured as a separate component and fixedly attached to the pivot arm body 98 or integrally formed with the pivot arm body 98. The cam 92 may include a contoured cam surface 102 engageable with a cam follower attached to second pivot arm located above and immediately adjacent the pivot arm 90.

The cam follower 94 may be disposed within a cavity formed within the pivot arm body 98. The cam follower 94 may be positioned below the cam surface 102 and generally centered widthwise along the pivot arm body 98. The cam follower 94 may be located on a side of the pivot arm body 98 opposite the component support finger 96. A cam follower fastener 104, such as a bolt or screw, may be used to attach the cam follower 94 to the pivot arm body 98. The cam follower 94 may be rotatably connected to the pivot arm body 98, or alternatively, fixedly attached to the pivot arm body 98. If rotatably connected to the pivot arm body 98, the cam follower 94 may include a bearing, or another friction-minimizing device, to reduce rotational friction between the cam follower 94 and the cam follower fastener 104.

The pivot arm 90 may be pivotable about the pivot connection 56 between an extended position and a retracted position. When arranged in the extended position, an end 106 of the component support finger 96 extends through the frame opening 34 beyond the outer face 76 of the bezel 38. When arranged in the retracted position the end 106 of the component support finger 96 does not extend beyond the outer face 76 of the bezel 38. The pivot arm 90 may be entirely disposed within the frame 26 when arranged in the retracted position.

Figures 15, 16:
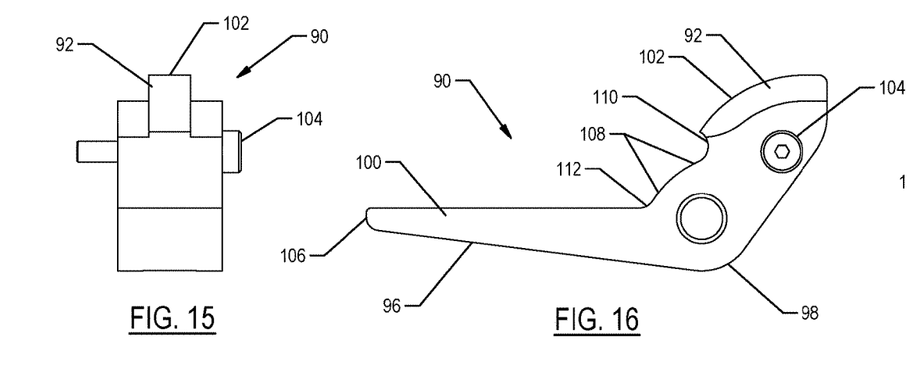
FIG. 15 is a front elevational view of the pivot arm of FIG. 13.
FIG. 16 is a side elevational view of the pivot arm of FIG. 13.
Figure 18:
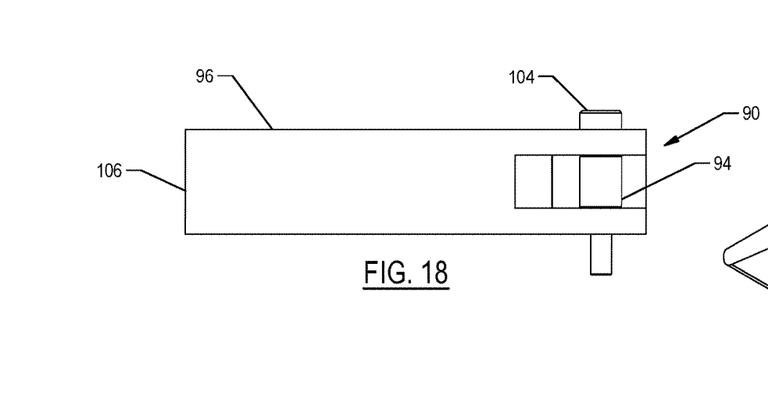
FIG. 18 is a bottom elevational view of the pivot arm of FIG. 13.
Figure 19:
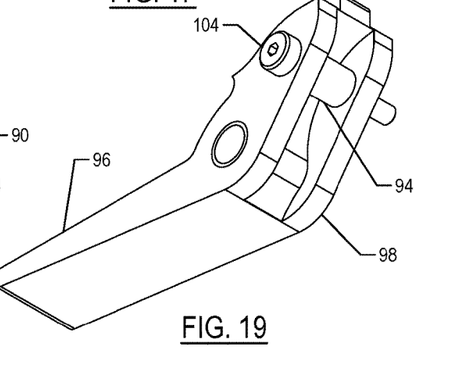
FIG. 19 is a bottom perspective view of the pivot arm of FIG. 13.

With reference to FIG. 16, the pivot arm 90 may include a pair of detents 108 that operate in conjunction with the stop 80 to limit a pivoting range of motion of the pivot arm 90. A first detent 110 operates on conjunction with the stop 80 to define the position of the pivot arm when arranged in the extended position. A second detent 112 operates in conjunction with the stop 80 to define the position of the pivot arm 90 when arranged in the retracted position.

The first detent 110 may be located on the same side of the pivot arm body 98 as the cam 92 and spaced a radial distance from the pivot connection 56. The first detent 110 engages the stop 80 when the pivot arm 90 is arranged in the extended position.

The second detent 112 may be located on the same side of the pivot arm body 98 as the component support finger 96 and spaced a radial distance from the pivot connection 56. The second detent 112 engages the stop 80 when the pivot arm 90 is arranged in the retracted position.

The first detent 110 and the second detent 112 may alternatively be positioned in a different location on the pivot arm 90. For example, the first detent 110 may be located along a lower edge of the component support finger 96 at a radial distance from the pivot connection 56 and the second detent 112 may be located along a lower edge of the pivot arm body 98 opposite the first detent 110. The location of the stop 80 may be determined based on the location of the first detent 110 and the second detent 112, and a desired angular orientation of the pivot arm 90 when arranged in the retracted and extended positions.

The pivot arm 90 may include a biasing member that operates to urge the pivot arm 90 toward the retraced position. For example, the biasing member may include a coil spring encircling the pivot arm fastener 50 used to attach the pivot arm 90 to the frame 26. One end of the coil spring may be attached to the pivot arm 90 and an opposite end of the coil spring may be attached to the frame 26. The biasing member may include a leaf spring having one end attached to the frame 26 and an opposite end engaging the pivot arm 90. Gravity may also be employed to bias the pivot arm 90 toward the retracted position. This may be accomplished by configuring the cam side of the pivot arm 90 to weigh more than the component support finger side of the pivot arm 90. The weight imbalance will cause the pivot arm 90 to tend to rotate toward the retracted position when not supporting a component on the component support finger 100. Alternatively, differently configured biasing mechanisms may also be employed.

Figure 20:
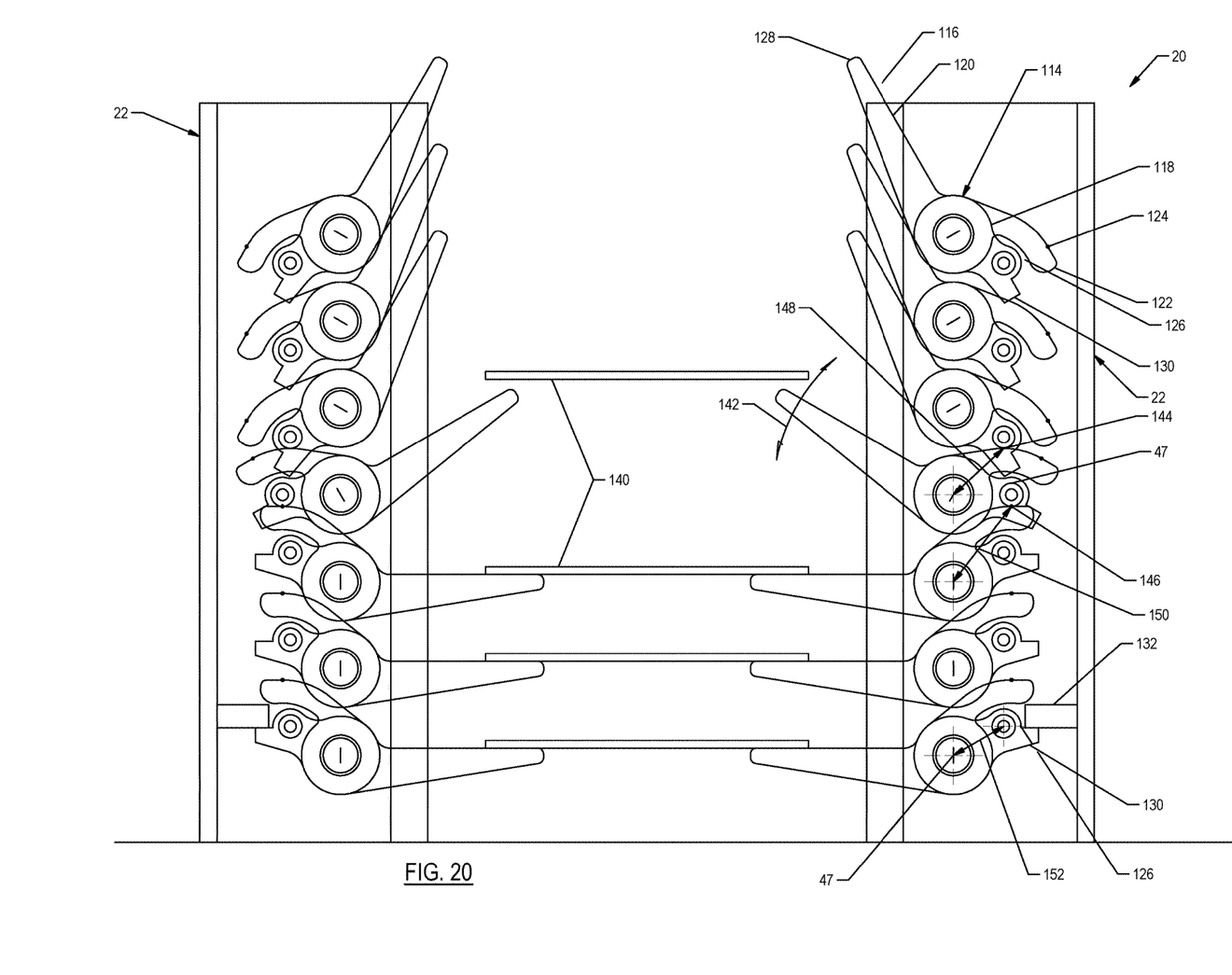
FIG. 20 is a side elevational view of an alternately configured pivot arm that may be employed with the stacker column.

FIG. 20 illustrates another alternately configured pivot arm 114 that may be employed with the stacker column 22. The pivot arm 114 may include a component support finger 116 that extends generally radially outward from a pivot arm body 118. The component support finger 118 may include a component support surface 120 for supporting a component when loaded on the passive part stacker 20. The pivot arm 114 may include a cam 122 extending radially outward from the pivot arm body 118 in a direction generally opposite that of the component support finger 116. The cam 122 and the component support finger 116 may be located on opposite sides of the pivot arm body 118.

The cam 122 may include a contoured cam surface 124 engageable with a cam follower attached to second pivot arm located above and immediately adjacent the pivot arm 114. The pivot arm 114 may include a cam follower 126 attached to the pivot arm body 118 and positioned below the cam surface 124. The cam follower 126 may be located on a side of the pivot arm body 118 opposite the component support finger 116.

The pivot arm 114 may be pivoted about the pivot connection 56 between an extended position and a retracted position. When arranged in the extended position, an end 128 of the component support finger 116 extends through the frame opening 36 beyond the outer face 76 of the bezel 38. When arranged in the retracted position the end 128 of the component support finger 116 does not extend beyond the outer face 76 of the bezel 38. The pivot arm 114 may be entirely disposed within the frame 26 when arranged in the retracted position.

The pivot arm 26 may include a detent 130 that operate in conjunction with a stop 132 to define the position of the pivot arm 114 when arranged in the extended position. The detent 130 may be located on the same side of the pivot arm body 118 as the cam 122 and spaced a radial distance from the pivot connection 56. The detent 130 engages the stop 132 when the pivot arm 114 is arranged in the extended position. The component support finger 116 may engage the pivot arm body 118 of a second pivot arm located above and immediately adjacent the pivot arm 114 when the pivot arm 114 is arranged in the retraced position. The pivot arm body 118 may operate as a second detent.

The pivot arm 114 may include a biasing member that operates to urge the pivot arm 114 toward the retraced position. For example, the biasing member may include a coil spring encircling the pivot arm fastener 50 used to attach the pivot arm 114 to the frame 26. One end of the coil spring may be attached to the pivot arm 114 and an opposite end of the coil spring may be attached to the frame 26. The biasing member may include a leaf spring having one end attached to the frame 26 and an opposite end engaging the pivot arm 114. Gravity may also be employed to bias the pivot arm 114 toward the retracted position. This may be accomplished by configuring the cam side of the pivot arm 114 to weigh more than the component support finger side of the pivot arm 114. The weight imbalance will cause the pivot arm 114 to tend to rotate toward the retracted position when not supporting a component on the component support finger 116. Alternatively, differently configured biasing mechanisms may also be employed.

With reference to FIGS. 1, 2, 4, 5 and 20, the passive part stacker 20 may be used to stack multiple components 140 one above the other. Adjacent stacked components 140 may be spaced apart from one another so as to not contact. The pivot arms 46, 90, and 114 may be used interchangeably with the passive part stacker 20. The pivot arms 46, 90, 114 may be biased to the retracted position (i.e., the position of the top three pivot arms 114 in FIG. 20) prior to loading the components 140 onto the passive part stacker 20. This prevents unused pivot arms 46, 90, 114 from interfering with the loading of components 140 onto the passive part stacker 20.

In order to receive a first component 140 onto the passive part stacker 20, a lowest most pivot arm 46, 90, 114 may be arranged in an intermediate component receiving position between the retracted position and the extended position. Pivot arm 114 (fourth pivot arm up from the bottom in FIG. 20) is illustrated in FIG. 20 arranged in the component receiving position. The end 74, 106, 128 of the component support finger 58, 96, 116 extend beyond the outer face 76 of the frame 26 when the pivot arm 46, 90, 114 is arranged in the component receiving position. As the component 140 is dropped into the passive part stacker 20, the component 140 engages the component support surface 60, 100, 120 of the component support finger 58, 96, 116. The weight of the component bearing down on the component support finger 58, 96, 116 overcomes the biasing force (whether mechanical or gravity based) exerted on the pivot arm 46, 96, 116 to cause the pivot arm 46, 90, 114 to move toward the extended position, which in turn causes the cam 62, 92, 122 and the cam follower 70, 94 124, to travel in a circular path 142 centered around the pivot arm axis of rotation 47. As this occurs, the cam surface 68, 102, 124 of the pivot arm 46, 90, 114 initially engages the cam follower 70, 94, 126 of a second pivot arm located immediately above and adjacent the first pivot arm at a first location 144 along the cam surface 68, 102, 124. Continued pivoting of the first pivot arm 46, 90, 114 from the component receiving position toward the extended position causes cam follower 70, 94, 126 of the second pivot arm to move lengthwise along the cam surface 68, 102, 124 and move the second pivot arm from the retracted position to the component receiving position. The cam follower 70, 94, 126 contacts the cam surface 68, 102 124 at a second location 146 when the pivot arm 46, 90, 114 is located in the extended position. The first contact location is spaced a first distance 148 from the pivot arm axis of rotation 47 and the second contact location is spaced a second distance 150 from the pivot arm axis of rotation 47, the second distance being greater than the first distance. The cam follower 70, 90, 114 may be spaced a third distance 152 from the pivot arm axis of rotation 47 that is less than the first distance 148 and the second distance 150.

The process may be repeated again with respect to the second pivot arm and a third pivot arm located immediately above and adjacent to the second pivot arm. For example, with the second pivot arm positioned in the component receiving position in response to moving the first pivot arm from the component receiving position to the extended position, loading a component on the second pivot arm will in turn cause the third pivot arm to move from the retracted position to the component receiving position. This process may be repeated as successive components 140 are loaded onto the passive part stacker 20. Unloading components from the passive part stacker 20 will allow the biasing mechanism (whether mechanical or gravity based) to pivot the pivot arm 46, 90, 114 from the extend position back to the retracted position.

It is intended that the scope of the present methods and apparatuses be defined by the following claims. However, it must be understood that the disclosed part stacker and methods of use may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A part stacker comprising:
    a frame;
    a stop attached to the frame;
    a first pivot arm pivotably attached to the frame and rotatable about a first pivot arm axis of rotation between a retracted position and an extended position, the first pivot arm comprising:
        a first pivot arm body;
        a first component support finger extending radially from the first pivot arm body; and
        a first cam extending radially outward from the first pivot arm body; and
    a second pivot arm pivotally attached to the frame and rotatable about a second pivot arm axis of rotation between a retracted position and an extended position, the second pivot arm including a first detent engageable with the stop when the second pivot arm is in the retracted position and a second detent engageable with the stop when the second pivot arm is in the extended position; the second pivot arm comprising:
        a second pivot arm body;
        a second component support finger extending radially from the second pivot arm body; and
        a second cam follower attached to the second pivot arm and engageable with the first cam of the first pivot arm;
    wherein the second cam follower of the second pivot arm is disengaged from the first cam of the first pivot arm when the first pivot arm is in the retracted position, the second cam follower engaging the first cam when the first pivot arm is in a receiving position located between the retracted and extended positions, the second pivot arm pivotable from a retracted position to a receiving position in response to moving the first pivot arm from its receiving position to its extended position.

2. The part stacker of claim 1, wherein the first cam and the first component support finger are located on diametrically opposite sides of the first pivot arm body.

3. The part stacker of claim 1, wherein the second cam follower of the second pivot arm is disengaged from the first cam of the first pivot arm when the second pivot arm is arranged in the extended position.

4. The part stacker of claim 1, wherein the stop is disengaged from the first and second detents when the second pivot arm is in the receiving position.

5. The part stacker of claim 1, wherein the second pivot arm is in the receiving position when the first pivot arm is in the extended position.

6. The part stacker of claim 1, wherein an end of the second component support finger extends beyond an outer edge of an opening at least partially defined by the frame when the second pivot arm is in the receiving and extended positions, the end of the second component support finger disposed inward of the outer edge of the opening when the second pivot arm is in the retracted position.

7. The part stacker of claim 1, wherein the second cam follower of the second pivot arm moves along a first cam surface of the first cam when moving the first pivot arm between the receiving position to the extended position.

8. The part stacker of claim 1, wherein the second pivot arm is located vertically above the first pivot arm.

9. The part stacker of claim 1, wherein the first cam of the first pivot arm travels along a circular path centered around the first pivot arm axis of rotation when moving the first pivot arm between the retracted and extended positions.

10. The part stacker of claim 9, wherein the second cam follower of the second pivot arm travels along a circular path centered around the second pivot arm axis of rotation in response to moving the first pivot arm between the receiving and extended positions.

11. The part stacker of claim 1, wherein the second cam follower of the second pivot arm contacts a cam surface of the first cam at a first location when the first pivot arm is in the receiving position and at a second location when the first pivot arm is in the extended position, the first location being spaced a first distance from the first pivot arm axis of rotation and the second location being spaced a second distance from the first pivot arm axis of rotation, the second distance being greater than the first distance.

12. The part stacker of claim 1, wherein the second pivot arm comprises a second cam extending radially from the second pivot arm body, the part stacker further comprising a third pivot arm rotatable about a third pivot arm axis of rotation between a retracted position and an extended position, the third pivot arm comprising:
    a third pivot arm body;
    a third component support finger extending radially from the third pivot arm body; and
    a third cam follower attached to the third pivot arm and engageable with the second cam of the second pivot arm;
    wherein the second cam follower of the second pivot arm is disengaged from the first cam of the first pivot arm when the third cam follower of the third pivot arm is engaged with the second cam of the second pivot arm.

13. The part stacker of claim 12, wherein the third cam follower of the third pivot arm contacts a second cam surface of the second cam at a first location when the second pivot arm is in the receiving position and at a second location when the second pivot arm is in the extended position, the first location being spaced a first distance from the second pivot arm axis of rotation and the second location being spaced a second distance from the second pivot arm axis of rotation, the second distance being greater than the first distance.

14. The part stacker of claim 13, wherein the second cam of the second pivot arm is spaced a third distance from the second pivot arm axis of rotation, the third distance being less than the first and second distances.

* * * * *